Feb. 26, 1952 C. L. FARRAND 2,587,451
SLIT CONTROL FOR SPECTROSCOPIC APPARATUS
Filed March 1, 1949 4 Sheets-Sheet 1

Fig. 1.

INVENTOR
CLAIR L. FARRAND
BY Pennie, Edmonds,
Morton and Barrows.
ATTORNEYS

Feb. 26, 1952 — C. L. FARRAND — 2,587,451
SLIT CONTROL FOR SPECTROSCOPIC APPARATUS
Filed March 1, 1949 — 4 Sheets-Sheet 3

INVENTOR
CLAIR L. FARRAND
BY Pennie, Edmonds,
Morton and Barrows
ATTORNEYS

Feb. 26, 1952           C. L. FARRAND           2,587,451
SLIT CONTROL FOR SPECTROSCOPIC APPARATUS
Filed March 1, 1949                          4 Sheets—Sheet 4

INVENTOR
CLAIR L. FARRAND
BY Pennie, Edmonds, Morton and Barrows
ATTORNEYS

Patented Feb. 26, 1952

2,587,451

UNITED STATES PATENT OFFICE 2,587,451

SLIT CONTROL FOR SPECTROSCOPIC APPARATUS

Clair L. Farrand, Bronxville, N. Y., assignor to Farrand Optical Co., Inc., New York, N. Y., a corporation of New York Application March 1, 1949, Serial No. 79,099

17 Claims. (Cl. 88—14)

1

The invention relates to spectroscopic apparatus and more particularly to the slit-defining mechanisms used to define entrance and exit apertures in such apparatus.

In monochromators for example it is often desired to relate some property of the light passing through the entire instrument to the wave length of that light according to some chosen function. Thus it is often desired to pass a constant band of wave lengths, or of frequencies, or a constant amount of energy, throughout the range of wave lengths explored by the instrument. Or it may be desired to have these quantities vary with the wave length passed by the instrument, either in a linear or non-linear way. These quantities are controlled by the entrance and exit slits of the instrument and variation of these quantities requires variation in the width of the slits as a function of wave length.

Because of the characteristics of the prisms or other dispersing elements employed, it is necessary even in order to hold any one of these quantities constant throughout the range of wave lengths explored, to vary the physical width of the slits, especially the exit slit, as a function of wave length. This variation in slit widths must be properly linked with the mechanism which selects the central wave length of the band passed through the instrument if the desired relation between this central wave length and the band of wave lengths passed (or other quantity to be controlled) is to be maintained.

I have devised a mechanism for varying the width of the slits of spectroscopic apparatus by a mechanism which may be adjustably linked to the wave length drive. The physical width of the slits and consequently the band of frequencies or wave lengths or the amount of flux passed by the instrument can by appropriate selection of cams be made to vary according to any desired function of wave length. For example, it can be made constant for all wave lengths. Moreover, although the nature of the function relating the center wave length of the band passed by the instrument to the equivalent slit widths is determined by the shapes of the cams employed, the function can, within limits, be altered by any desired numerical factor without change of cams or disassembly of the apparatus. This numerical multiplying factor may, in apparatus according to my invention, be cranked in through a front panel control.

My invention is applicable for example either to single or double monochromators, and the slit width drive thereof may be applied to any

2 one or more of the slits found in either of such instruments. The invention is not limited in application to monochromators employing any particular form of wave length selecting apparatus. All that is required is that the wave length drive be translatable into the rotation of a shaft.

By way of example the invention will be described as applied to a double mono-chromator employing spherical mirrors as collimating elements and in which the wave length selecting elements comprise two plane mirrors, placed behind fixed dispersing prisms, the plane mirrors being rotatable with respect to the base of the instrument. The use of reflecting instead of refracting collimators obviates the necessity for changing the length of the optical path between the slits as the wave length of the transmitted light is changed inasmuch as the focal length of such reflecting collimators is independent of wave length. Such an instrument is especially adapted to operate in the infrared range of radiation.

In the accompanying drawings.

In the double monochromator of Fig. 1 a base plate 1 supports two dispersing prisms 2 and 3, rotatable plane "Littrow" mirrors 4 and 5 for selecting the wave length transmitted through the instrument, entrance, middle and exit slits 7, 9 and 11, and all necessary collimating and reflecting elements as will be hereinafter described.

Light entering the instrument passes through the entrance slit 7 and is reflected by a reflecting face 14 of the prism 13 onto a spherical collimating mirror 15. The entering light is rendered parallel by the collimating mirror 15 and makes a first pass through the first dispersing prism 2. It is then reflected from the first wave length selecting mirror 4. The light returning from the mirror 4 is dispersed a second time on its second transit through the prism 2. Of the light returned through the prism 2 only a component of a relatively narrow band of wave lengths determined by the orientation of the plane mirror 4 is focused by the spherical mirror 15 into an image of the entrance slit 7 which is cast upon the middle slit 9 by a second reflecting face 16 of the prism 13.

The light which gets through the middle slit 9 is reflected at a second prism 17 onto a second spherical mirror 19 which returns this light parallel for passage through the second dispersing prism 3. After passing twice through the second prism 3 light of a high degree of purity is focused by the mirror 19 on the exit slit 11. The light emerging from the exit slit passes to a reflecting mirror 21 and thence to a detecting element such as a thermocouple 35 after reflection at an ellipsoidal mirror 24. The entrance, middle and exit slits may therefore all lie in parallel planes.

Figure 1:
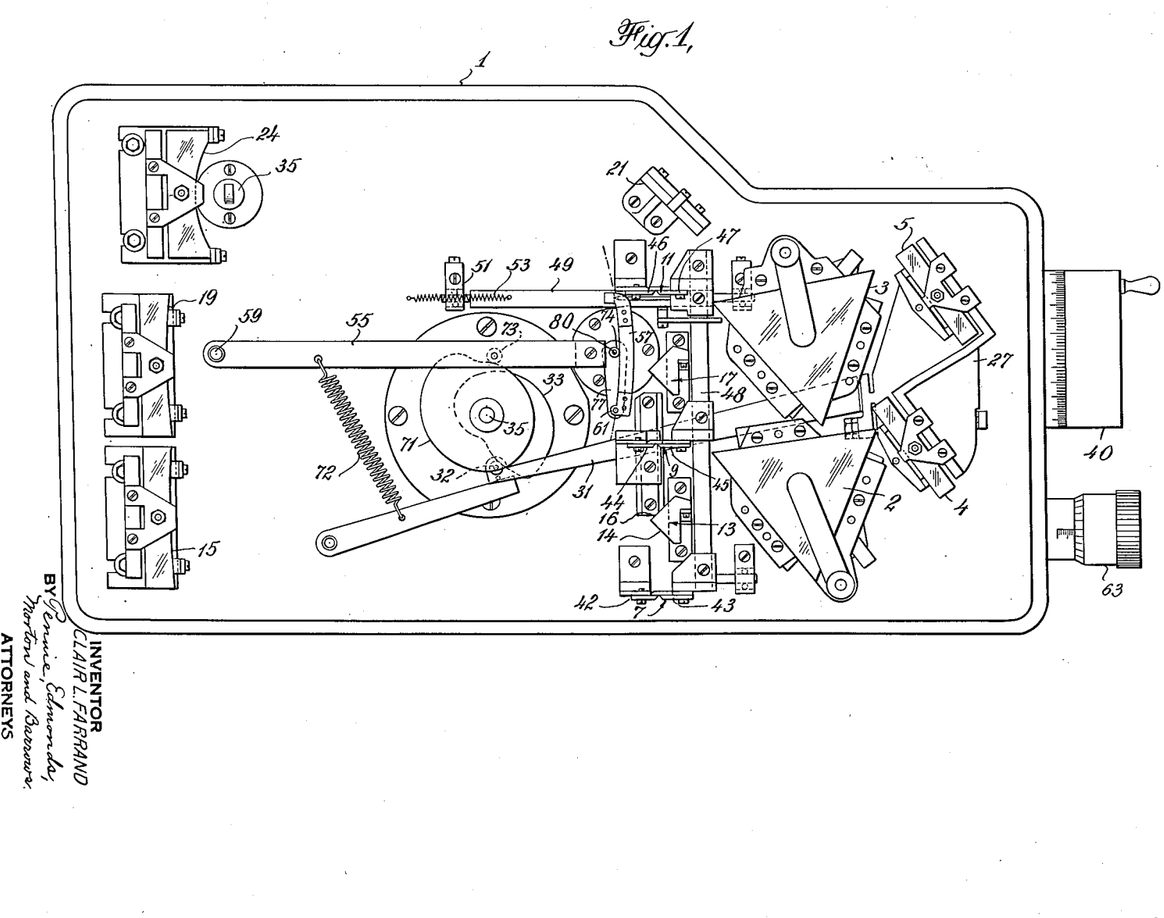
Fig. 1 is a schematic plan view of a double monochromator constructed according to my invention and especially adapted for use in the infrared range of radiation.
Figure 2:
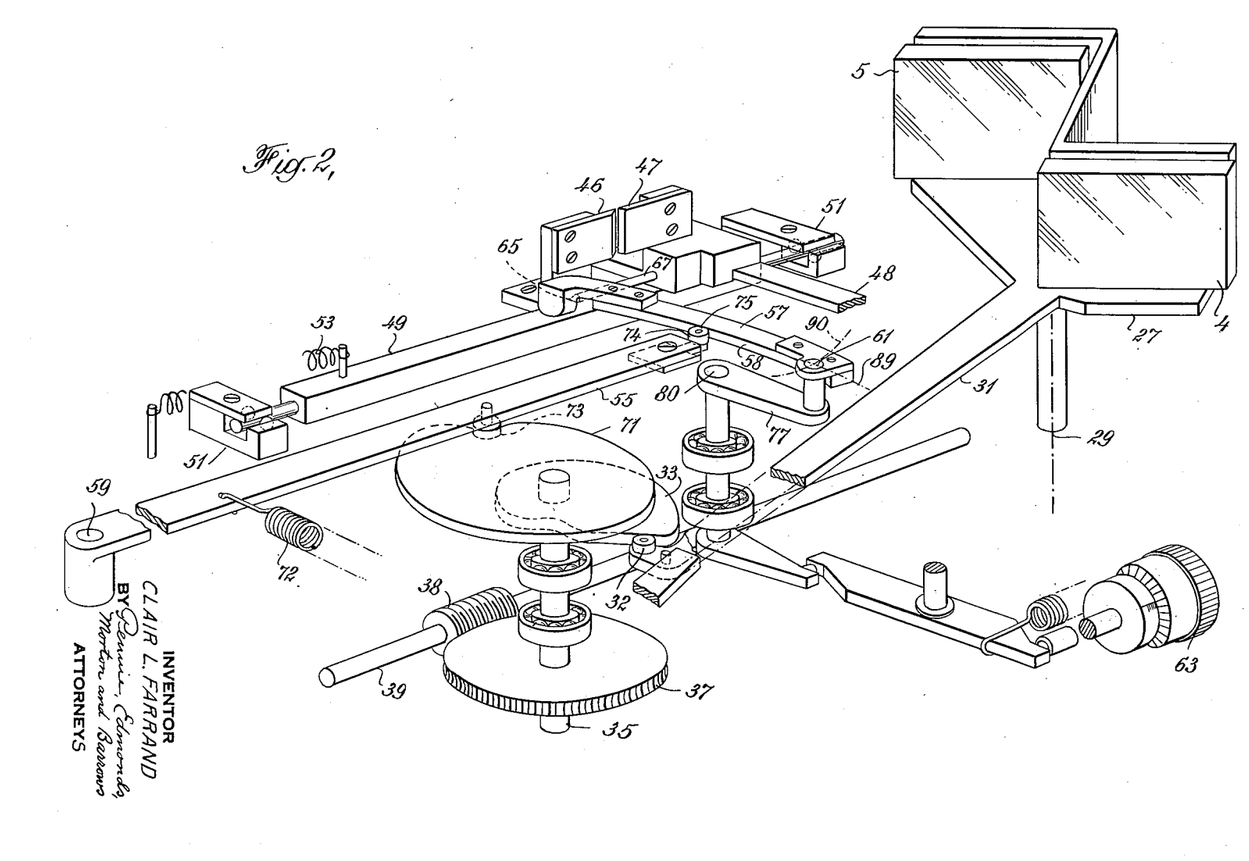
Fig. 2 is a perspective view of the wave length and slit width drive mechanism of the instrument of Fig. 1.

The coupled slit width drive and wave length drive mechanisms of the embodiment of Fig. 1 are shown in Fig. 2. The wave length selecting mirrors 4 and 5 are mounted together on a table 27 rotatable about a vertical axis 29. A lever 31 affixed to the table 27 makes contact through a suitable roller 32 with a wave length drive cam 33 mounted for rotation on a vertical shaft 35. The shaft 35 may be rotated manually or mechanically through suitable conventional means such as a worm wheel 37 and worm 38. The worm shaft 39 may carry a calibrated wave length drum 40 on the front panel of the instrument (Fig. 1). The cam 33 may be advantageously cut so that with given dispersing prisms 2 and 3 the central wave length of the band of wave lengths emerging from the exit slit will be a linear function of the rotation of the worm shaft 39.

The entrance, middle and exit slits 7, 9 and 11 are varied in width by means of appropriate mechanism linked to the wave length drive shaft 35 as follows:

The entrance, middle and exit slits are provided each with one jaw fixed with reference to the base plate 1, the fixed jaws being respectively denoted 42, 44 and 46 (Fig. 1). The movable jaws 43, 45 and 47 are supported together upon a crossbar 48 affixed to a carriage 49 which rides below the base plate on suitable ball-bearing supports indicated at 51 in Fig. 2. The carriage 49 is restricted to a horizontal line of motion parallel to the plane of the slits. A tension spring 53 connected between the slit jaw carriage 49 and a support affixed to the base plate tends to close the slits by drawing the carriage 49 to the left (in Fig. 2.).

Figures 3, 4:
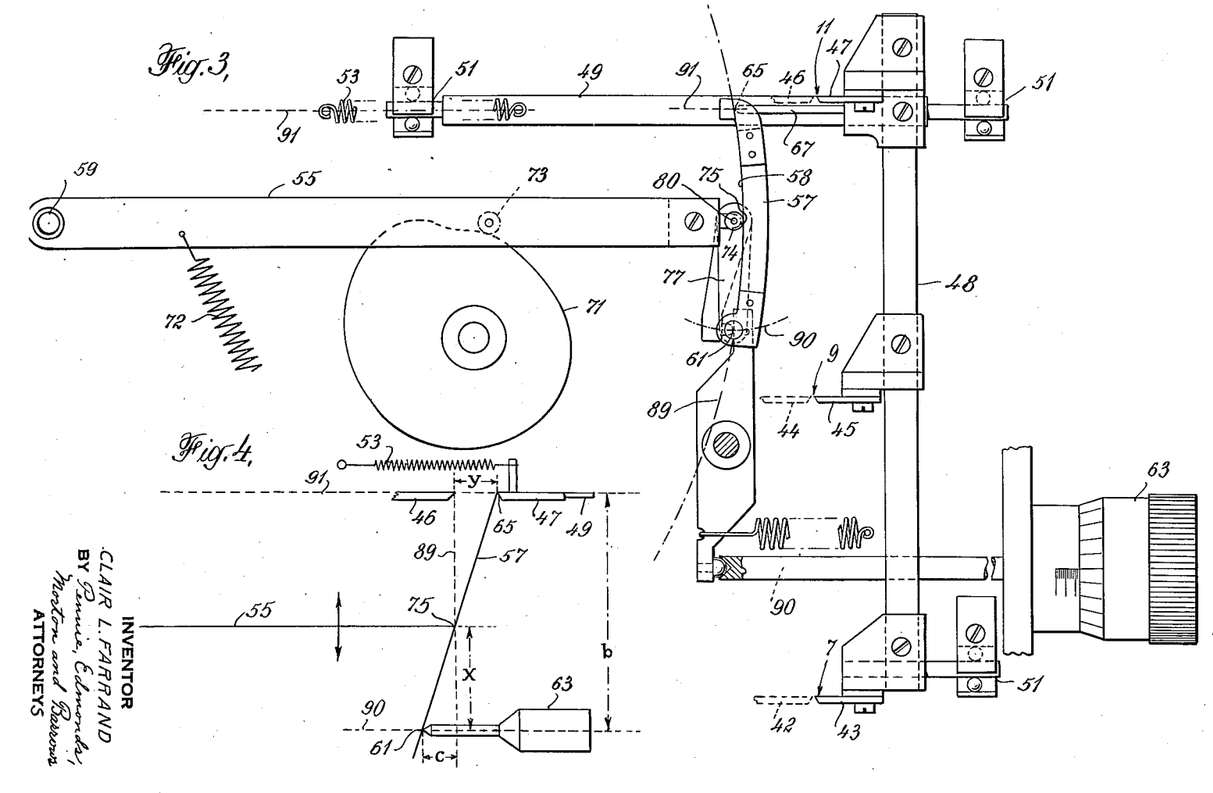
Fig. 3 is a plan schematic view of the slit width drive alone.
Fig. 4 is a sketch illustrating the motion of the elements shown in Fig. 3.

The slits are opened by the motion of the slit jaw carriage under the influence of a carriage lever or rocker arm 57. The carriage lever 57 is pivoted at a point 61 adjustably fixable with reference to the base 1. A spur 67 affixed to the slit jaw carriage provides linkage between the slit jaw carriage and the lever, the point of contact between the spur and lever being indicated at 65. Upon motion of the slit jaw carriage the point of contact 65 traces out a path 91 (Fig. 3) parallel to the direction of motion of the slit jaw carriage. In the embodiment of Fig. 1 as seen in Fig. 3, rotation of the carriage lever 57 in a clockwise direction about the pivot 61 opens the slit jaws.

The pivot 61 of the lever 57 is arranged for adjustment backwards and forwards along a line of position 90 (Fig. 3) produced by the rotation of a multiplying lever 77 fixedly pivoted at 80 in the base 1 (Fig. 2). The pivot 61 is movable along the path 90 through a narrow portion thereof which is substantially parallel to the path 91 of the slit jaw carriage.

The multiplying lever 77 adjusts the position of the pivot 61 under the influence of a front panel micrometer control 63. At one of the limits of its travel the pivot 61 lies on the arc 89 which is the line of motion traced out by the end 75 of the radius bar 55, to be further described below. At the other limit of its travel the pivot 61 lies inside of the arc 89. When the slits are closed the contact point 65 lies on this arc also.

The carriage lever 57 is rotated about its adjustable pivot 61 by the motion of a lever-actuating member formed by the end 75 of a radius bar 55, fixedly pivoted in the monochromator frame at 59. The radius bar carries a roller 74 at its free end which bears against the inner face 58 of the carriage lever 57. The total length of the radius bar extends therefore from the pivot 59 to the periphery 75 of the roller 74. The pivot 59 of the radius bar is preferably disposed in the base 1 at a separation from the path 91 followed by the point of contact 65 amounting to one half the separation of the pivot 61 from the path 91. With the pivot 59 so disposed the line of motion 89 traced by the end 75 of the radius bar intersects the paths 90 of the pivot 61 and 91 of the slit jaw carriage at equal angles which are very nearly right angles.

The carriage lever 57 is preferably so shaped that the pivot 61 and the point of contact 65 lie (geometrically) on a surface continuous with the inside surface 58 of the carriage lever which is presented to the radius bar 55.

The tension spring 53 disposed between the frame and slit jaw carriage maintains the slit jaw carriage, carriage lever 57 and radius bar 55 in contact with each other.

The radius bar 55 carries a cam follower 73 mounted intermediate its ends which is maintained in contact with a slit width cam 71 by means of a tension spring 72. The slit width cam 71, like the wave length cam 33, is affixed to the drive shaft 35. Rotation of the shaft 35 therefore effects a rotation of the radius bar 55 about its pivot point 59.

The carriage lever 57 may be provided as shown in Fig. 3 with an inner face 58 curved to conform to the arc of a circle whose radius equals the length of the radius bar 55. A carriage lever so constructed provides a smooth relation between the motions of the slit jaw carriage, the carriage lever and the radius bar 55. The range of the motion required of the slit jaw carriage is so small however so that the relation between the motions of the slit jaw carriage 49, adjustable pivot 61 and the end 75 of the radius bar 55 may be computed to a good approximation by neglecting the curvature of the inner face 58 of the carriage lever, of the arc 89 through which the end 75 of the radius bar moves, and of the line of position 90 followed by the pivot 61.

Figures 5, 6:
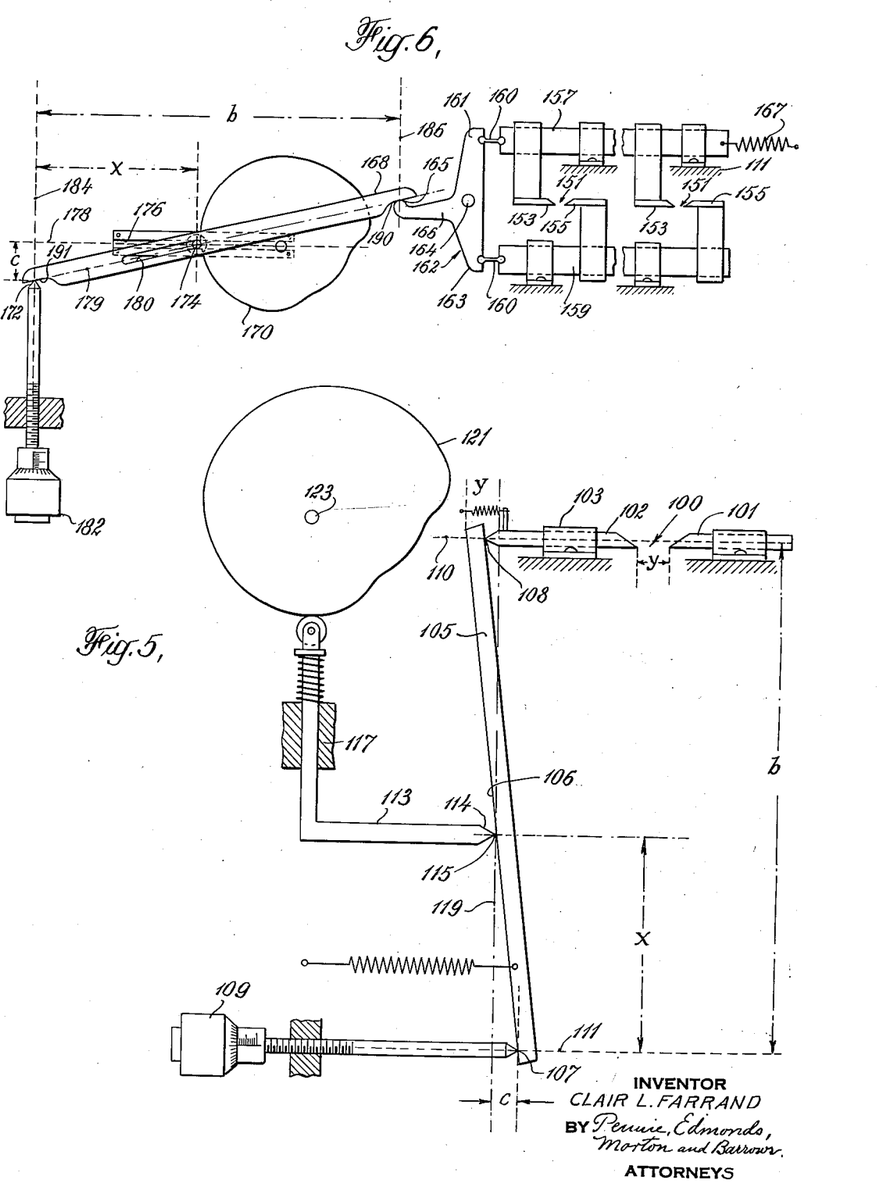
Fig. 5 is a diagrammatic view of a slit width drive embodying my invention in a modified form.
Fig. 6 is a diagrammatic view of a slit width drive embodying my invention in a further modified form.

Alternative constructions to give the pivot 61 and the end 75 of the radius bar geometrically straight lines of motion are illustrated in Figs. 5 and 6.

With the construction of Figs 1-3, in computing the angular motion of the radius bar required to produce a motion of the end 75 thereof which will result in a desired motion of the slit jaw carriage, the end 75 of the radius bar is of course taken again as moving along a circle centered about the povot 59 of the radius bar and having a radius equal to the length of the radius bar.

The relation of these elements is shown in Fig. 4. The path of the slit jaw carriage (i. e. of the point of contact 65) is indicated by the dashed line 91 and the line of position of the pivot 61 by the dashed line 90 parallel to the line 91. The arc traced out by the free end 75 of the radius bar is indicated by the dashed straight line 89, intersecting the lines 90 and 91 at equal angles which are preferably but not necessarily right angles, as shown. The carriage lever (and more particularly its surface 58 contacting the radius bar) is replaced by the straight line 57 joining the pivot 61 with the point of contact 65. The micrometer 63 is indicated schematically as directly connected to the pivot 61, the additional linkage of the multiplying lever 77 and associated components being omitted from this figure for simplicity. The fixed jaw of one of the slits is indicated schematically at 46 with its complementary movable jaw shown mounted at 47 on the slit jaw carriage 49 in a position to bring the slit opening to zero when the contact point 65 falls upon the line 89.

If the pivot 61 is brought by the micrometer 63 to fall upon the path 89, the spring 53 will close the jaws regardless of the position of the radius bar 55 and therefore regardless of the orientation of the slit width cam 71 and drive shaft 35, since the carriage lever will then coincide throughout its length with the path 89 followed by the end 75 of the radius bar.

With the pivot 61 to the left of the intersection of the pivot line of position 90 with the line of motion 89 (i. e. with the pivot 61 on the left or concave side of the path 89) rotation of the radius bar 55 about its pivot point 59 (indicated in Fig. 4 as motion of the end 75 of the radius bar along a straight path 89 perpendicular to the length of the radius bar), in conjunction with the action of the tension spring 53, constrains the carriage lever 57 to rotate about its pivot at 61. The slit jaws are thus opened as the radius bar approaches the pivot 61 and closed as it recedes therefrom. If $b$ is the distance along the path 89 from the line of motion 91 followed by the free end 65 of the carriage lever to the line of position 90 and if $x$ is the distance along the path 89 from the free end 75 of the radius bar to the line of position 90, the slit opening $y$ is related to $x$ by the expression $$y = c\frac{b-x}{x}$$

wherein $c$ denotes the departure of the pivot point 61 from its zero position on the path 89. This expression follows from the similar triangles made out by the lines 90, 91, 57 and 89. From this expression it is apparent that the slit opening $y$ is a product of two factors. The factor $$\frac{b-x}{x}$$

depends upon the position of the end 75 of the radius bar 55, and hence on the shape and angular position of the slit width cam 71. The factor $c$ is a multiplier independent of this position, and is cranked in by the front panel control 63.

A desired progression of values for the slit width $y$ to be achieved for the various values of the central wave length passed by the instrument may be translated according to the above expression into a desired progression of values for $x$, the position of the end 75 of the radius bar, and consequently into a desired progression of values for the angular position of the radius bar 55 about its fixed pivot 59. This desired motion of the radius bar 55 as a function of the angular position of the shaft 35 which determines the central wave length passed by the instrument may be achieved by providing a slit width cam 71 of the proper shape.

Otherwise stated, with a value for $c$ other than zero the slit width $y$ will vary with $x$ i. e., with the angular position of the slit width cam 71 against which rests the radius bar 55. Since by rotation of the wave length cam 33 the central wave length passed by the instrument is a function of the angular position of the shaft 35 to which both the wave length and slit width cams are affixed, a suitably shaped slit width cam 71 will cause $y$ to vary with wave length in any desired manner. Moreover the adjustable pivot 61 of the carriage lever 57 permits the absolute slit opening $y$ to be further varied within limits in proportion to the quantity $c$, without changing the function between central wave length and slit opening except by the factor of proportionality.

If for example it is desired to pass a constant band of wave lengths through the range of operation of the instrument a single cam appropriate to the dispersing elements employed and to the range of wave lengths to be covered may be cut and the absolute magnitude of the band of wave lengths passed may yet be varied without change of cams by changing the position of the pivot point 61. Inasmuch as at any given wave length the fraction of the spectrum passed by the instrument is small, a change of the slit width will produce a proportionate change in the band of wave lengths transmitted. The micrometer 63 may therefore be calibrated linearly in terms of the band of wave lengths passed by the instrument.

A modified slit width drive having advantages similar to those of the drive described in connection with Figs. 2, 3 and 4 is shown diagrammatically in Fig. 5. A slit 100 forming part of a spectroscopic instrument has a jaw 101 fixed in a frame (not shown) and a movable jaw 102. The movable jaw is mounted on suitable supports such as ways 103 which permit the movable jaw to move in the plane of the slit 100. The opening of the slit 100 is varied by motion of the jaw 102 under the influence of a lever 105 which corresponds to the carriage lever 57 of the embodiment of Figs. 1-4. The jaw 102 and lever 105 are linked together at a point of contact at 108 which follows the rectilinear path indicated by the dashed line 110. The lever 105 is supported by conventional means not shown for rotation about an adjustably fixable pivot point 107 at the end of the lever remote from the slit. The pivot point 107 is adjusted by a micrometer 109 along a line of position 111 parallel to the dashed line 110. The lever 105 is actuated by the end 114 of a cam follower 113 which provides the lever 105 with a moving fulcrum indicated at 115 on the surface 106 of the lever which is presented to cam follower. The cam follower is supported in ways 117 so as to perform rectilinear motion, the fulcrum 115 on the end 114 of the cam follower tracing out a line of motion 119 which intersects the parallel lines 110 and 111 in equal angles. The element are preferably arranged so that the path 119 is perpendicular to the lines 110 and 111, as shown in the figure. The cam follower rides on a slit width cam 121 affixed to a drive shaft 123 which may be linked by appropriate mechanism not shown to the drive which operates the movable wave length selecting elements of the instrument.

When the micrometer 109 is adjusted to bring the pivot 107 onto the line of motion 119 followed by the moving fulcrum 115 at the end 114 of the cam follower 113, the surface 106 of the bar 105 lies on the line of motion 119. Under these conditions motion of the cam and cam follower produces no motion of the lever 105 and the slit opening is independent of the position of the cam 121. The lever 105, movable jaw 102 and associated elements may be so dimensioned that the jaws are closed for this condition. The slit opening $y$ is then equal to the departure of the surface 106 from the line 119 along the line 110.

The analysis detailed in connected with the slit width drive illustrated in Fig. 4 applies to the embodiment of Fig. 5 as well. The slit width opening $y$ is the product of the departure $c$ of the pivot point 197 from the line of motion 119 multiplied by the quantity $$\frac{b-x}{x}$$

wherein $b$ is the distance along the line of motion 119 between its intersections with the lines 110 and 111, and $x$ is the distance along the line of motion 119 from the fulcrum 115 to the path 111. In the embodiment of Fig. 5 the shape of the slit width cam 121 is computed without reference to the considerations of angular movement performed by the radius bar 55 of the embodiment of Figs. 1–4. Obviously, as in the structure illustrated in Fig. 1, two or more slits may be coupled together to have a common motion in the embodiment of Fig. 5.

Still a further embodiment is illustrated in Fig. 6. In the embodiment of Fig. 6 a spectroscopic instrument includes two or more slits 151 of which both sets of jaws 153 and 155 are movable. The jaws 153 are mounted together upon a suitable carriage 157 and the jaws 155 are similarly mounted on a carriage 159. The carriages 157 and 159 are supported by conventional means in a frame (not shown) so as to be capable of rectilinear motion in planes parallel to the plane of the slits 151. The carriages 157 and 159 are coupled through flexible inextensibe links 160 to the arms 161 and 163 of a spider 162. The spider is fixedly pivoted at 164 in the frame of the instrument. Rotation is imparted to the spider at a bearing point 165 at the end of a third arm 166 by means of a lever 168 which rotates under the infuence of a slit width cam 170 and cam follower 174 about an adjustably fixable pivot point 172. The cam follower moves in ways 176 so as to trace out a straight line of motion indicated by the dashed line 178, and the elements are preferably (although not necessarily) so arranged that the path 184 through which the pivot point 172 is moved by the micrometer 182 is perpendicular to the path 178 of the cam follower.

The lever 168 is provided with a lengthwise slot 180 which engages with and may be supported by an axial extension of the cam follower. The lever is provided at its ends with bearing surfaces 190 and 191 for contact with the spider arm 166 and with the shaft of the micrometer 182 at the pivot 172. These bearing surfaces may advantageously be made to lie on the center line 179 of the slot 180. Motion of the cam follower swings the lever 168 about its pivot 172, if the pivot 172 lies off the path 178 of the cam follower. A spring 167 connected between the jaw support 157 and the frame tends to close the jaws and maintains the micrometer shaft, lever and spider in contact.

As the lever 168 rotates around the pivot point 172 the point of contact 165 between the lever 168 and spider 162 will describe a path 186 which for the small variations in split opening necessary, approximates a straight line parallel to the line 184. The exact shape of the path will depend upon the shape of the arm 166 in the neighborhood of the contact point 165, and can be made a straight line parallel to the line 184 by proper shaping of the arm 166. If $y$ denotes the excursion of the point of contact 165 along the line 186 from the null position occupied by the point 165 when the slot 180 in the lever 168 is parallel to the cam follower path 178, and if $b$ denotes the separation of the line 186 from the line 184 and $x$ the separation of the cam follower 174 from the line 184, then, again:

$$y = c\frac{b-x}{x}$$

As in the previously described embodiments, $c$ is the departure of the pivot point 172 from its null position, for which the center line 179 of the slot coincides with the path 178 of the cam follower. The opening of the slits 151 is directly proportional to $y$.

In place of the slits moved mechanically bilaterally shown, the mechanism of Fig. 6 could obviously be applied to slits having one movable jaw only.

The slit width drive of the present invention is applicable to spectroscopic equipment generally, and is not restricted in utility to the monochromator illustrated in the drawings. It may be employed wherever it is desired to vary a slit width according to a chosen function, and is of especial utility where it is desired to obtain the flexibility provided by the adjustable multiplying factor of the present invention. The slit width drive may be linked if desired to the wave-length selecting means of the instrument, whatever the nature of that means—whether a rotating prism or grating, or a source of collection system moved with reference to a frame in which the dispersing element is fixed.

I claim:

1. In a monochromator having a base, a fixed dispersing element, a slit having a fixed jaw and a movable jaw, and a mirror rotatable with respect to the dispersing element for selecting the central wave length of the band of wave lengths passed by the monochromator, means for varying the width of the slit as a function of the angular orientation of the mirror, said slit width varying means comprising: a slit jaw carriage movable with respect to the base, the said slit jaw carriage carrying the movable jaw of the slit, a rotatable shaft, a wave length cam fixed on the shaft, a wave length cam follower riding on the wave length cam, means linking the rotation of the mirror with the motion of the wave length cam follower, a slit width cam affixed to the shaft, a radius bar fixedly pivoted with respect to the shaft and having a cam follower intermediate its ends riding on the slit width cam, a rocker arm pivoted at one end for rotation about a point adjustably fixable with respect to the base, the rocker arm being arranged to ride on the free end of the radius bar, and means linking the free end of the rocker arm with the slit jaw carriage.

2. In a monochromator in which the exit slit has a movable jaw and in which the wave length selecting element comprises a mirror mounted on a table rotatable with respect to a base which supports the dispersing element, means to link the rotation of the mirror table with the motion of the movable jaw, said means comprising: a shaft rotatable with respect to the base, a first linkage operatively connecting the rotation of the mirror table with the rotation of the shaft, a carriage supporting the movable jaw for motion in a plane substantially parallel to the plane of the exit slit, a slit width cam affixed to the shaft, a slit width cam follower riding on the slit width cam, and a second linkage connecting the slit width cam follower with the carriage, the said second linkage including a lever pivoted for rotation about a point adjustably fixable with respect to the base, whereby adjustment of the position of the lever pivot alters a numerical multiplying factor relating the motion of the slit width cam follower and the motion of the carriage.

3. In a monochromator having a base, a fixed dispersing element, an entrance and an exit slit each having a movable jaw, and a mirror rotatable with respect to the dispersing element for selecting the central wave length of the band of wave lengths passed by the monochromator, means for varying the width of the entrance and exit slits as a function of the angular orientation of the mirror comprising a slit jaw carriage movable with respect to the base, the slit jaw carriage carrying one jaw of each of the entrance and exit slits, a rotatable shaft, a wave length cam fixed on the shaft, a wave length cam follower riding on the wave length cam, means linking the rotation of the mirror with the motion of the wave length cam follower, a slit width cam affixed to the shaft, a slit width cam follower riding on the slit width cam, and a linkage connecting the slit width cam follower with the slit jaw carriage, said linkage including a lever having a pivot at one end thereof adjustably fixable with respect to the base.

4. In a monochromator having a base, a light-dispersing element, an entrance and an exit slit, said exit slit having at least one jaw mounted on a slit jaw carriage movable with respect to the base in a direction parallel to the plane of the exit slit, one or more collimating elements adapted to render parallel the light entering the monochromator at the entrance slit thereof and to focus a component of the said parallel light on the exit slit after dispersion in the dispersing element, a plurality of reflecting elements adapted in conjunction with said collimating elements to define an optical axis joining the entrance and exit slits, a dispersing element interposed in said optical path, and means to vary the orientation of one or more of the said reflecting elements with respect to the optical path whereby the wave length of light falling upon the exit slit is varied, the improvement which comprises means to vary the width of the exit slit as a function of the wave length of light falling on the exit slit, said means comprising a shaft rotatable with respect to the base, a wave length cam affixed to the shaft, a wave length cam follower riding on the wave length cam, a first linkage connecting the wave length cam follower with the said one or more reflecting elements, a slit width cam affixed to the shaft, a slit width cam follower riding on the slit width cam, and a second linkage connecting the motion of the slit width cam follower with the motion of the slit jaw carriage, said second linkage including a lever having a pivot point adjustably fixable with respect to the base, whereby the motion of the slit jaw carriage produced by the motion of the slit width cam may be altered by an adjustably fixable numerical multiplying factor.

5. In a monochromator including a base, a dispersing element fixed with respect to the base, a mirror behind the dispersing element mounted for rotation with respect to the base, and entrance and exit slits disposed in parallel planes and adapted respectively to admit light to the monochromator and to receive light after a first passage through the dispersing element, reflection at the mirror, and a second passage through the dispersing element, the entrance and exit slits each having one jaw affixed to the base and one jaw mounted upon a slit jaw carriage movable with respect to the base in a direction parallel to the plane of the slits, means linking the rotation of the mirror with the motion of the slit jaw carriage according to a desired function, said function including an adjustable numerical factor, said means comprising: a shaft rotatable with respect to the base, a wave length cam affixed to the shaft, a wave length cam follower riding on the wave length cam, a first linkage connecting the rotation of the mirror with the motion of the wave length cam follower, a slit width cam affixed to the shaft, a slit width cam follower riding on the slit width cam, and a second linkage connecting the motion of the slit width cam follower with the motion of the slit jaw carriage, said second linkage including a lever having a pivot point adjustably fixable with respect to the base, whereby the motion of the slit jaw carriage produced by motion of the slit jaw cam may be altered by an adjustably fixable numerical factor.

6. In a monochromator comprising a base, a dispersing element, and a slit having at least one jaw movable with respect to the base, and in which the motion of the wave length selecting element or elements is referable to the rotation of a shaft mounted for rotation with respect to the base, means to vary the width of the slit as a function of the wave length of light passing through the monochromator, said means comprising: a support for the movable jaw movable with respect to the base, spring means disposed between the jaw support and the base tending to close the slit, an arcuate lever, a pivot for the arcuate lever adjustably fixable with respect to the base, thrust-transmitting means disposed between the free end of the arcuate lever and the jaw support adapted to translate rotational motion of the arcuate lever about its pivot into linear motion of the jaw support, a second lever fixedly pivoted in the base and adapted to engage with its free end the arcuate lever between the ends thereof, the arcuate lever having exposed to the second lever a surface conforming substantially to an arc of a circle having a radius equal to the length of the second lever, the adjustable pivot of the arcuate lever being adjustable between limits fixed with respect to the base one of which places the end of the said arcuate surface adjacent the adjustable pivot substantially on the arc of the circle described by the free end of the second lever and the other of which places the said end inside of that arc, and a cam affixed to the shaft, the said cam engaging the second lever between the ends thereof.

7. In a spectroscopic instrument having movable wave length selecting means and a drive for moving the said means, a slit width drive comprising a rotatable shaft linked to the wave length drive, a cam on the shaft, a cam follower bearing against the cam, a slit having a jaw movable in the plane of the slit, and a lever linked at one end to the movable jaw and having at its other end a pivot adjustably fixable at points along a line of position parallel to the plane of the slit, the said lever engaging the cam follower at successively changing points intermediate its ends according to the angular position of the cam.

8. In a spectroscopic instrument having a frame, a slit including a movable jaw, movable means to select light of successively varying wave lengths for transmission through the slit, and driving means to drive the wave length selection means, a slit width drive adapted to vary the opening of the slit, said slit width drive comprising a support for the movable jaw, a lever operatively connected at one end to the movable jaw support and having at its other end a pivot adjustably fixable with reference to the frame along a given line of position, a shaft linked to the wave length selection means, a slit width cam affixed to the shaft, a cam follower riding on the slit width cam, and means to restrict the cam follower to a line of motion intersecting the pivot line of position at a large angle, the cam follower being so disposed as to engage the lever between the ends thereof at successive positions along the lever according to the angular position of the cam, whereby the lever is rotated by the cam follower about the pivot.

9. In a spectroscopic instrument including a frame, a slit having movable jaws, means to select light of successively varying wave lengths for transmission through the slit, and driving means to drive the wave length selecting means, a slit width drive adapted to bilaterally vary the opening of the slit, the said slit width drive comprising supporting means for each of the slit jaws, guides restricting the jaw supporting means to motion in planes parallel to the plane of the slit opening, a spider pivotally supported in the frame between the jaw supporting means, the spider being connected to the jaw supporting means, a shaft journaled for rotation in the frame, the shaft being linked in its rotation with the drive for the wave length selecting means, a cam affixed to the shaft, a cam follower riding on the cam, means restricting the cam follower to a given path, a slotted lever engaging the cam follower with its slot, the slotted lever bearing at one of its ends against the spider and tending to rotate the spider, the slotted lever bearing at its other end against a pivot adjustably fixable with reference to the frame along a line of position angularly disposed to the cam follower path, whereby a given motion of the cam follower rotates the lever about its pivot through an angle proportional to the departure of the pivot from the intersection of its line of position with the path of the cam follower.

10. In a spectroscopic instrument including a frame, a slit of variable width having a movable jaw, means to select light of successively varying wave lengths for transmission through the slit, and driving means to drive the wave length selecting means, a slit width drive adapted to vary the opening of the slit as a function of the wave length of light passing therethrough, said slit width drive comprising a support for the movable jaw, a spider pivotally mounted in the frame and operatively connected by one of its arms to the movable jaw support, a lever bearing at one of its ends against a second arm of the spider and at its other end against a pivot adjustably fixable with reference to the frame, means to adjustably fix the pivot at points along a line of position fixed with respect to the frame, a shaft journaled in the frame and linked in its rotation with the wave length selecting drive, a cam affixed to the shaft, a cam follower riding on the cam, means to restrict the cam follower to a given line of motion intersecting the line of position of the pivot, and a slot in the lever adapted to engage the cam follower, whereby the end of the lever remote from the adjustably fixable pivot is caused by the motion of the cam follower to execute a motion proportional to the departure of the adjustable pivot from the intersection of line of motion followed by the cam follower with the line of position of the pivot.

11. In a spectroscopic instrument including a frame and a slit of variable width having a movable jaw, a slit width drive comprising a lever, an adjustably fixable pivot for the lever adjacent one end thereof, means to adjustably fix the pivot at points along a line of position fixed with reference to the frame, a lever-actuating member arranged to move along a line of motion fixed with reference to the frame and substantially perpendicular to the line of position of the pivot, means to drive the lever-actuating member, means to retain the lever engaged with the lever-actuating member at points along the length of the lever intermediate its ends, whereby the motion of the end of the lever remote from the pivot produced by motion of the lever-actuating member is the product of a factor representative of the motion of the lever-actuating member multiplied by a factor representative of the departure of the pivot from the intersection of the line of position of the pivot with the line of motion of the lever-actuating member, and a linkage operatively connecting the end of the lever remote from the pivot with the movable jaw.

12. In a spectroscopic instrument including a frame and a slit of variable width having a movable jaw, a slit width drive comprising a lever, an adjustably fixable pivot for the lever adjacent one end thereof, means to adjustably fix the pivot at points along a line of position fixed with reference to the frame, a lever-actuating member arranged to move along a line of motion fixed with reference to the frame and substantially perpendicular to the line of position of the pivot, means to drive the lever actuating member, means to retain the lever engaged with the lever-actuating member at points along the length of the lever intermediate its ends, whereby the motion of the end of the lever remote from the pivot produced by motion of the lever-actuating member is the product of a factor representative of the motion of the lever-actuating member multiplied by a factor representative of the departure of the pivot from the intersection of the line of position of the pivot with the line of motion of the lever-actuating member, and a linkage operatively connecting the end of the lever remote from the pivot with the movable jaw, the linkage being so proportioned that the jaws of the slit are closed when the pivot lies on the said intersection.

13. In a spectroscopic instrument, a slit width drive comprising a slit having two jaws of which at least one is movable, a lever linked at one end to the movable jaw and having an adjustably fixable pivot adjacent its other end, means to adjustably fix the pivot at points along a line of position, means to rotate the lever about the pivot, said last-named means including a rotatable shaft, a cam affixed to the shaft, a cam follower riding on the cam and engaging the lever at successive points intermediate its ends according to the angular position of the cam along a substantially straight line of motion intersecting the line of position of the pivot substantially at right angles, whereby the motion of the end of the lever remote from the pivot which is produced by the motion of the cam follower will be the product of a factor representative of the position of the cam follower multiplied by a factor representative of the departure of the adjustably fixable pivot from the intersection of the line of motion of the cam follower with the line of position of the pivot.

14. In a spectroscopic instrument including a frame, a slit of variable width having a movable jaw, means to select light of successively varying wave lengths for transmission through the slit, and driving means to drive the wave length selecting means, a slit width drive adapted to vary the opening of the slit as a function of the wave length of light passing therethrough, said slit width drive comprising a lever-actuating member, means to drive the lever-actuating member along a given substantially rectilinear line of motion fixed with reference to the frame, said means being linked to the wave length selecting drive, a lever having an adjustably fixable pivot, means to adjustably fix the pivot at points along a line of position fixed with reference to the frame and substantially perpendicular to the line of motion of the lever-actuating member, means to secure engagement between the lever and the lever-actuating member at points along the lever intermediate its ends, whereby motion of the lever-actuating member along its given line of motion rotates the lever about its pivot, the end of the lever remote from the pivot executing for given increments of motion of the lever-actuating member a motion which is proportional to the departure of the pivot from the intersection of the pivot line of position with the line of motion of the lever-actuating member, and a linkage operatively connecting the end of the lever remote from the pivot with the movable slit jaw.

15. In a spectroscopic instrument including a frame and a slit of variable which having a movable jaw, a slit width drive comprising a lever-actuating member, means to drive the lever-actuating member along a given line of motion, a lever having an adjustably fixable pivot, means to adjustably fix the pivot at points along a line of position angularly disposed to the given line of motion of the lever-actuating member, means to secure engagement between the lever and the lever-actuating member at points along the lever intermediate its ends, whereby motion of the lever-actuating member along its given line of motion rotates the lever about its pivot, the end of the lever remote from the pivot executing for given increments of motion of the lever-actuating member a motion which is proportional to the departure of the pivot from the intersection of the pivot line of position with the line of motion of the lever-actuating member, and a linkage operatively connecting the end of the lever remote from the pivot with the movable slit jaw.

16. In a spectroscopic instrument including a slit limiting the spectrum transmitted by the instrument and a dispersing element movable to change the mean wavelength of the radiation falling on the slit, the combination of a first cam adapted to move the dispersing element, a second cam proportioned to vary the width of the slit as a predetermined function of wavelength, a drive common to both of said cams, and a lever having two ends and a variably positioned fulcrum, one end of the lever effecting motion of one jaw of the slit and the other end of the lever being positioned by an adjustable stop, said fulcrum engaging a cam follower connected to said second cam, whereby radiation varying in band width as a predetermined function of wavelength and independently adjustable in percentage band width is transmitted by the instrument.

17. In a spectrometric instrument including a slit limiting the spectrum transmitted by the instrument and a dispersing element movable to change the mean wavelength of the radiation falling on the slit, the combination of a cam proportioned to vary the width of the slit as a predetermined function of wavelength, a cam follower operatively connected with the cam, and a lever having two ends and a variably positioned fulcrum, one end of the lever effecting motion of one jaw of the slit and the other end of the lever being positioned by an adjustable stop, said fulcrum engaging the said cam follower, whereby radiation varying in band width as a predetermined function of wavelength and independently adjustable in percentage band width is transmitted by the instrument.

CLAIR L. FARRAND.

REFERENCES CITED

The following references are of record in the file of this patent:

UNITED STATES PATENTS

| Number | Name | Date |
|---|---|---|
| 1,964,365 | Razek et al. | June 26, 1934 |
| 2,227,510 | Pineo | Jan. 7, 1941 |
| 2,236,379 | Pineo | Mar. 25, 1941 |
| 2,408,512 | Gradisar | Oct. 1, 1946 |
| 2,411,741 | Michaelson | Nov. 26, 1946 |

FOREIGN PATENTS

| Number | Country | Date |
|---|---|---|
| 503,167 | Great Britain | Apr. 3, 1939 |